Aug. 23, 1927.

1,639,863

C. C. SINCLAIR ET AL

ARTIFICIAL BAIT OR LURE AND METHOD OF FINISHING THE SAME

Filed July 16. 1926

INVENTOR
Clyde C. Sinclair
Floyd A. Phelps
BY
Chappell Earl
ATTORNEYS

Patented Aug. 23, 1927.

1,639,863

UNITED STATES PATENT OFFICE.

CLYDE C. SINCLAIR AND FLOYD A. PHELPS, OF PAW PAW, MICHIGAN, ASSIGNORS TO MOONLIGHT BAIT COMPANY, OF PAW PAW, MICHIGAN.

ARTIFICIAL BAIT OR LURE AND METHOD OF FINISHING THE SAME.

Application filed July 16, 1926. Serial No. 122,871.

The main object of this invention is to provide an improved method of ornamenting baits or lures by means of which a roughened light reflecting surface is secured resembling the scales of a fish.

A further object is to provide an artificial bait or lure which is very attractive and produces an iridescent scintillating effect when in the water.

Objects relating to details and economies of our improved bait and the method of finishing the same will definitely appear from the detailed description to follow. The invention is clearly defined and pointed out in the claims.

A bait illustrating our improvements and the method of finishing is clearly illustrated in the accompanying drawing forming a part of this application, in which.

Figure 1:
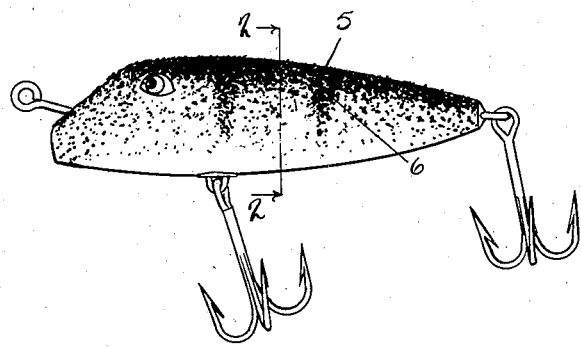
Fig. 1 is a side view of a bait or lure embodying the features of our invention.
Figure 2:
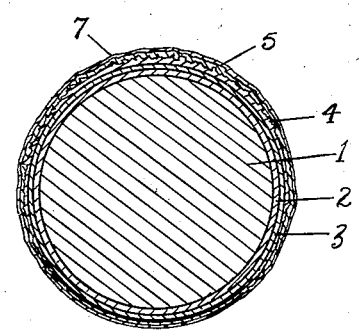
Fig. 2 is a cross section on a line corresponding to line 2—2, Fig. 1, the elements of the finish being conventionally illustrated and greatly exaggerated.
Figure 3:
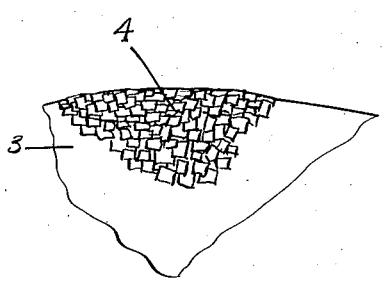
Fig. 3 is an enlarged fragmentary view illustrating one of the steps in our improved method of ornamentation.

Referring to the drawing, it will be understood that the parts are shown conventionally and thick coatings illustrated as a matter of convenience.

The bait body 1 is formed of suitable shape and material, red cedar being found satisfactory. A suitable foundation 2 is applied to the body, preferably enamel, and this foundation is tinted as may be desired. For instance, the sides of the bait body may be tinted pink and the bottom left white.

To this foundation we apply a coating 3 of shellac and prior to the setting of this shellac, or while it is in a tacky condition we spray or sprinkle upon the coating flake-like particles 4 of metal or other suitable light reflecting material. These are preferably applied more thickly at the back, gradually thinning toward the bottom of the bait as is indicated in Fig. 1.

The portions of the surface indicated at 5 and 6 along the back and sides of the bait are then preferably tinted to indicate variations in coloring corresponding to those of the fish to be assimilated, a dark green area along the back and running down on to the sides being illustrated.

It will be understood that in practice any tinting shade desired may be provided to indicate spots, stripes or the like, this tinting being done by means of an air brush, which permits ready blending of the coloring.

A coating of waterproof varnish or shellac 7 is then applied, this coating, however, not being of such thickness as to fill in all the irregularities or spaces between the particles 4 so that the portion of the bait carrying this material has a roughened glistening or light reflecting surface which is highly ornamental and very attractive when in the water as it produces a scintillating, glistening or iridescent effect as the bait is propelled through the water.

It will be understood that the accompanying drawing is mainly conventional and that, while we have used and described certain materials, there are other materials which may be used with quite satisfactory results.

Having thus described our invention what we claim as new and desire to secure by Letters Patent is:

1. The method of finishing artificial baits or lures consisting of applying a background coating and tinting selected areas thereof, applying shellac and sprinkling thereon flake-like particles of light reflecting material prior to the setting of the shellac, tinting portions of the surface carrying such light reflecting material, and finishing with a transparent water resisting coating.

2. The method of finishing artificial baits or lures, consisting of applying a background coating, applying shellac and sprinkling thereon flake-like particles of light reflecting material prior to the setting of the shellac, and finishing with a transparent water resisting coating.

3. The method of finishing artificial baits or lures consisting of applying a background coating, selected areas of which are tinted, applying an adhesive material to said background coating, sprinkling such adhesive material with flakes of metal providing a roughened surface of light reflecting particles, tinting portions of such surface, and finishing with a transparent water resisting coating.

4. The method of finishing artificial baits or lures consisting of applying a coating of adhesive material, and applying to such coating prior to its hardening flake-like particles of light reflecting material providing a roughened surface of such flake-like light reflecting particles simulating scales.

In witness whereof we have hereunto set our hands.

CLYDE C. SINCLAIR.
FLOYD A. PHELPS.